United States Patent
Haruna

(10) Patent No.: US 10,218,996 B2
(45) Date of Patent: Feb. 26, 2019

(54) MOTION VECTOR DETECTION APPARATUS AND METHOD OF CONTROLLING MOTION VECTOR DETECTION APPARATUS

(71) Applicant: CANON KABUSHIKI KAISHA, Tokyo (JP)

(72) Inventor: Kohta Haruna, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 73 days.

(21) Appl. No.: 15/361,733

(22) Filed: Nov. 28, 2016

(65) Prior Publication Data

US 2017/0163997 A1 Jun. 8, 2017

(30) Foreign Application Priority Data

Dec. 3, 2015 (JP) .................................. 2015-236994

(51) Int. Cl.
*H04N 19/513* (2014.01)
*H04N 19/167* (2014.01)
*G06T 7/246* (2017.01)
*H04N 19/17* (2014.01)

(52) U.S. Cl.
CPC .......... *H04N 19/513* (2014.11); *G06T 7/246* (2017.01); *H04N 19/167* (2014.11); *H04N 19/17* (2014.11)

(58) Field of Classification Search
CPC ..... H04N 19/513; H04N 19/167; G06T 7/246
See application file for complete search history.

(56) References Cited

U.S. PATENT DOCUMENTS

2012/0294371 A1* 11/2012 Kitahara ................ H04N 19/52
375/240.16

FOREIGN PATENT DOCUMENTS

JP         2006-317848 A    11/2006

* cited by examiner

*Primary Examiner* — Nam D Pham
(74) *Attorney, Agent, or Firm* — Carter, DeLuca, Farrell & Schmidt, LLP

(57) ABSTRACT

Among motion vectors detected relative to a reference image for each of a plurality of areas of a base image, motion vectors related to a moving object are determined. Based on a point of interest and a movement direction of the moving object, one of more of the motion vectors related to the moving object are determined as candidate vector(s), and a representative vector of the moving object is calculated based on the candidate vector(s). A motion vector detection apparatus capable of calculating a motion vector that expresses an angular velocity at a specific position of an object, and a method of controlling the motion vector detection apparatus, are provided.

14 Claims, 14 Drawing Sheets

FIG. 4A
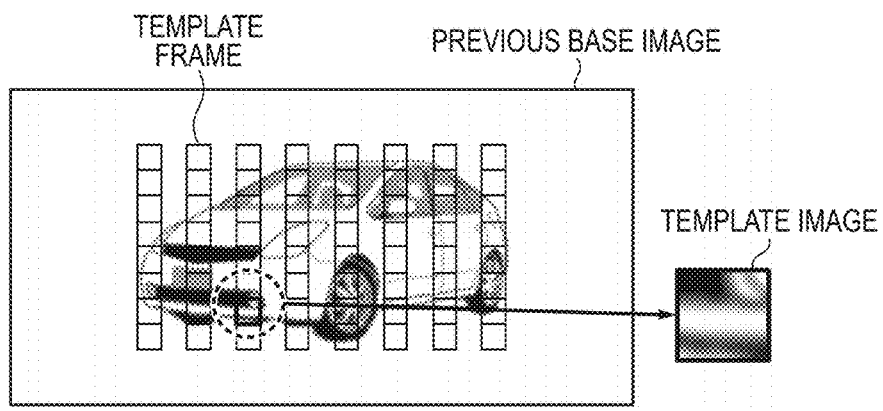
TEMPLATE FRAME
PREVIOUS BASE IMAGE
TEMPLATE IMAGE
FIG. 4B
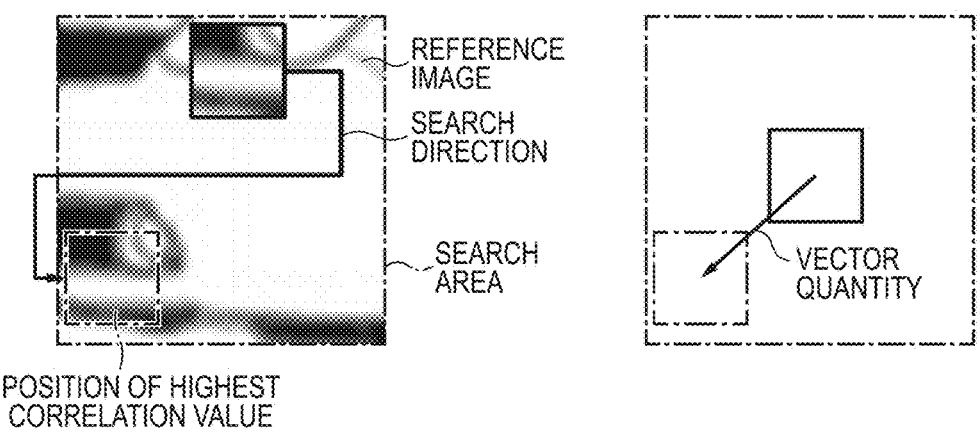
REFERENCE IMAGE
SEARCH DIRECTION
SEARCH AREA
POSITION OF HIGHEST CORRELATION VALUE
VECTOR QUANTITY
FIG. 4C
| FRAME NUMBER | HORIZONTAL MOTION VECTOR | VERTICAL MOTION VECTOR | ERROR NUMBER |
|---|---|---|---|
| [50] | 4.5[pixel] | -3.25[pixel] | 0 |
| [51] | 96[pixel] | 0.0390625[pixel] | 1 |
| [52] | 4.125[pixel] | -0.0625[pixel] | 2 |

F I G. 12

| FRAME NUMBER | Cx | Cy | γi |
|---|---|---|---|
| 34 | 68 | 52 | -14.3108 |
| 35 | 84 | 52 | 0 |
| 36 | 100 | 52 | 14.31084 |
| 37 | 116 | 52 | 28.62167 |
| 38 | 132 | 52 | 42.93251 |
| 39 | 148 | 52 | 57.24334 |
| 40 | 36 | 60 | -39.3548 |
| 41 | 52 | 60 | -25.044 |
| 42 | 68 | 60 | -10.7331 |

MOTION VECTOR DETECTION APPARATUS AND METHOD OF CONTROLLING MOTION VECTOR DETECTION APPARATUS

BACKGROUND OF THE INVENTION

Field of the Invention

The present invention relates to a motion vector detection apparatus and a method of controlling the motion vector detection apparatus, and more specifically relates to a technique of detecting a motion vector of a moving object.

Description of the Related Art

Panning exists as a technique of capturing that expresses a sense of speed of a moving object. Panning is a technique of obtaining an image in which the moving object is still and a background is blurred, by performing exposure while moving a camera so as to match movement of the object. When the amount of movement of the camera during exposure is small, blurring of the background is small, and the panning effect also is small. Therefore, such that the camera moves sufficiently during exposure, a slower shutter speed is set as the movement speed (on an imaging plane) of the object decreases.

Effects of panning are obtained by comparing the blurred background to the moving object in a still state, so it is important that the moving object is captured in a still state. Therefore, it is necessary to move the camera with that movement matched to movement of the object on the imaging plane during exposure, but this is not easy. When the movement speed of the camera is faster or slower than the movement speed of the object, the object is blurred also.

Therefore, a panning assist function that assists panning by applying a shake correction technique has been proposed (see Japanese Patent Laid-Open No. 2006-317848). In Japanese Patent Laid-Open No. 2006-317848, an offset between movement of the moving object and movement of the camera is detected based on motion vectors between images, and a shift lens is driven so as to correct the offset.

In Japanese Patent Laid-Open No. 2006-317848, among motion vectors that can be detected from images captured during movement of the camera, an area where a motion vector is smaller than in its surroundings is detected as an object area, and the motion vector of the object area is detected as the offset between movement of the moving object and movement of the camera.

In a case where a plurality of motion vectors have been detected within a certain area, it is known to use an average motion vector or a high-frequency motion vector as a representative motion vector of that area. However, in a case where this sort of representative motion vector is used as the motion vector of the object area in the above-described panning assist function, the following sort of problems occur.

For example, a representative motion vector obtained by averaging a plurality of motion vectors that were detected within an object area often expresses the angular velocity of an object in approximately the center of the angle of view. However, the angular velocity of the object is not necessarily fixed within the angle of view. For example, when an object having uniform linear motion is observed from one point, a greater angular velocity is observed as the distance between the observation position and the object decreases. Accordingly, in an image obtained with the panning assist function based on the representative motion vector, which expresses the angular velocity of the object in the center of the angle of view, even if the object is in a still state in the vicinity of the center of the angle of view, blurring increases as the distance from the center of the angle of view increases (as image height increases). Therefore, for example in a case where a focus detection area has been set to a position away from the center of a screen, an intended image (an image in which the focus detection area is in a still state) cannot be obtained even when the panning assist function is enabled.

SUMMARY OF THE INVENTION

The present invention was made in consideration of such problems in the conventional techniques, and provides a motion vector detection apparatus capable of calculating a motion vector that expresses an angular velocity at a specific position of an object, and a method of controlling the motion vector detection apparatus.

According to an aspect of the present invention, there is provided a motion vector detection apparatus, comprising: a detecting unit adapted to detect, for each of a plurality of areas of a base image, a motion vector relative to a reference image; a motion vector determining unit adapted to determine, among the motion vectors, motion vectors related to a moving object; a candidate vector determining unit adapted to determine, based on a point of interest that is a position within an image and a movement direction of the moving object, one or more of the motion vectors related to the moving object as candidate vector(s); and a calculating unit adapted to calculate a representative vector of the moving object based on the candidate vector(s).

According to another aspect of the present invention, there is provided an image capture apparatus, comprising: a motion vector detection apparatus that comprises: a detecting unit adapted to detect, for each of a plurality of areas of a base image, a motion vector relative to a reference image; a motion vector determining unit adapted to determine, among the motion vectors, motion vectors related to a moving object; a candidate vector determining unit adapted to determine, based on a point of interest that is a position within an image and a movement direction of the moving object, one or more of the motion vectors related to the moving object as candidate vector(s); and a calculating unit adapted to calculate a representative vector of the moving object based on the candidate vector(s); a converting unit adapted to convert the representative vector to an angular velocity; and a correcting unit adapted to execute shake correction based on the angular velocity.

According to a further aspect of the present invention, there is provided a method of controlling a motion vector detection apparatus, comprising: detecting, for each of a plurality of areas of a base image, a motion vector relative to a reference image; determining, among the motion vectors, motion vectors related to a moving object; determining, based on a point of interest that is a position within an image and a movement direction of the moving object, one or more of the motion vectors related to the moving object as candidate vector(s); and calculating a representative vector of the moving object based on the candidate vector(s).

According to an aspect of the present invention, there is provided a non-transitory computer-readable medium storing a program for causing a computer to function as a motion vector detection apparatus comprising: a detecting unit adapted to detect, for each of a plurality of areas of a base image, a motion vector relative to a reference image; a motion vector determining unit adapted to determine, among the motion vectors, motion vectors related to a moving object; a candidate vector determining unit adapted to determine, based on a point of interest that is a position within an image and a movement direction of the moving object, one or more of the motion vectors related to the moving object as candidate vector(s); and a calculating unit adapted to calculate a representative vector of the moving object based on the candidate vector(s).

Further features of the present invention will become apparent from the following description of exemplary embodiments with reference to the attached drawings.

BRIEF DESCRIPTION OF THE DRAWINGS

FIGS. 4A to 4C show an overview of motion vector detection and exemplary motion vector information in an embodiment.

FIG. 12 illustrates candidate vector determination processing according to the third embodiment.

DESCRIPTION OF THE EMBODIMENTS

Exemplary embodiments of the present invention will now be described in detail in accordance with the accompanying drawings. Note that below, an example is described in which a motion vector detection apparatus according to an embodiment of the present invention is applied to a digital camera, but in the present invention, functions related to image capture or recording of a captured image are not essential. The present invention can be embodied in an arbitrary electronic device capable of acquiring a plurality of images for detecting a motion vector and information related to an object distance. Examples of such an electronic device include a digital still camera or video camera, a personal computer, a game device, a mobile telephone, a mobile information terminal, a car navigation system, a drive recorder, a robot, or the like, but the electronic device is not limited to these examples. Also, a shake correction scheme for realizing a panning assist function using a motion vector detected with the motion vector detection apparatus according to an embodiment may be an optical shake correction scheme in which an image sensor or a shift lens is driven, or may be an electronic shake correction scheme in which a pixel cropping position is controlled. Also, an optical scheme and an electronic scheme may be used together.

First Embodiment

Figure 1:
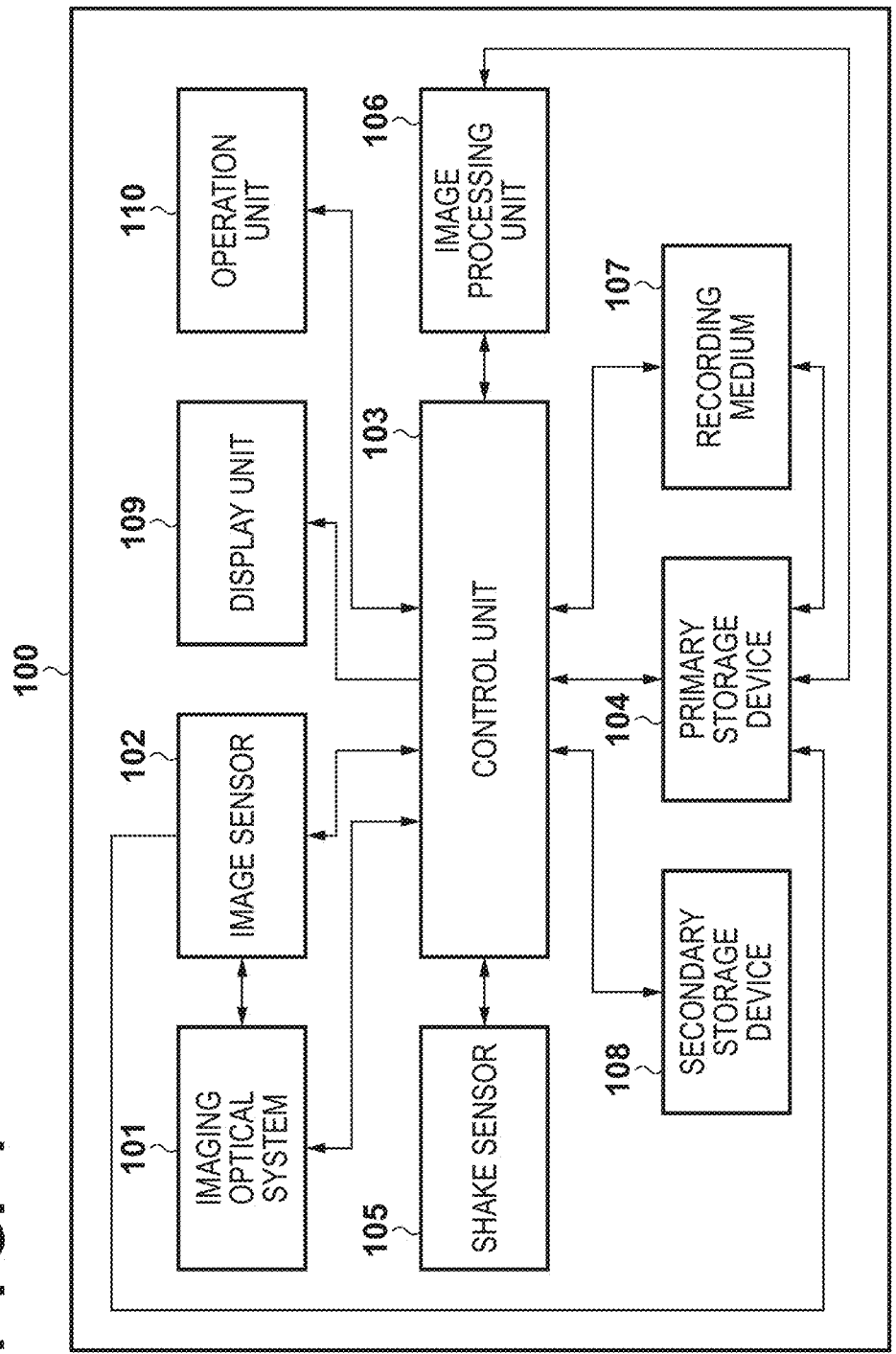
FIG. 1 is a block diagram showing an exemplary functional configuration of a digital camera in which a motion vector detection apparatus according to an embodiment is applied.

FIG. 1 is a block diagram that schematically shows the functional configuration of a digital camera 100 common to embodiments of the present invention.

An imaging optical system 101 is configured from a lens, a shutter, and an aperture, and forms light from an object into an image on an image sensor 102. The imaging optical system 101 includes a focus lens for adjusting a focus distance. The imaging optical system 101 may also include a shift lens for shake correction. Driving of movable members (the shutter, the aperture, the focus lens, and the shift lens) included in the imaging optical system 101 is controlled by a control unit 103.

The image sensor 102 may be a CCD image sensor or a CMOS image sensor, and has a plurality of pixels arranged in two dimensions. The pixels have a photoelectric conversion function, and the object image formed on the imaging plane by the imaging optical system 101 is converted to an electrical signal in each pixel.

A shake sensor 105 generates a signal according to movement of the digital camera 100, and outputs the signal to the control unit 103. The shake sensor 105, for example, may be an angular velocity sensor such as a gyro sensor, and generates a signal for each direction component (for example, components of an x axis, a y axis, and a z axis) of movement. Note that the shake sensor 105 may also be provided in the imaging optical system 101.

The control unit 103 has one or more programmable processors such as a CPU or an MPU, for example. The control unit 103, for example, by reading a program stored in a secondary storage device 108 into a primary storage device 104 and executing the program, controls operation of each functional block of the digital camera 100, thereby causing various functions of the digital camera 100 to be realized. The control unit 103 executes processing to discriminate between an object area and a background area using a motion vector that was detected with an image processing unit 106, and processing to generate a motion vector that expresses acceleration of a specific position of the object area. Accordingly, the motion vector detection apparatus is realized by the control unit 103, or by a combination of the control unit 103 and the image processing unit 106.

The primary storage device 104 is a volatile device such as a RAM, for example, and is used for temporary storage of data and operation of the control unit 103. Also, information stored in the primary storage device 104 is also utilized in the image processing unit 106, and recorded to a recording medium 107. The secondary storage device 108 is a non-volatile storage device such an EEPROM, for example, and stores a program executed by the control unit 103, firmware, various settings information, GUI data, and the like.

The recording medium 107 is non-volatile, and is used as a recording destination of image data or the like stored in the primary storage device 104. Reading/writing of the recording medium 107 is controlled by the control unit 103. In a case where the recording medium 107 is removable from the digital camera 100, for example such as a semiconductor memory card, the digital camera 100 has a structure whereby the recording medium 107 is removable.

A display unit 109 is used for a live-view display, display of an image stored in the primary storage device 104 (an image prior to recording to the recording medium 107 or an image that has been read out from the recording medium 107), and display of a GUI image or the like for interactive operation. The display unit 109 may also be a touch display.

An operation unit 110 is an input device group for a user to perform various input to the digital camera 100. The operation unit 110 may include an input device configured to receive voice input or sight-line input, in addition to an input device that requires physical operation such as a switch, a button, a lever, or a touch panel, for example. The digital camera 100 of the present embodiment has a switch (SW1) that is switched ON by a half stroke of a release button included in the operation unit 110, and a switch (SW2) that is switched ON by a full stroke. Note that the release button is used for capture of a still image, and a moving image record button may be separately provided for capture of a moving image.

Switching the SW1 ON instructs starting of a pre-capture operation. The pre-capture operation includes AF (auto-focus) processing and AE (auto-exposure) processing. The AE processing and the AF processing can be performed by the control unit 103 based on information obtainable from an image for live-view display, for example.

Also, switching the SW2 ON instructs starting of a capture operation of an image for recording. The generated image for recording is stored in the primary storage device 104. The control unit 103, after performing encoding processing with the image processing unit 106 as necessary, stores the image in a data file according to a recording format, and records the data file to the recording medium 107.

The image processing unit 106, for example, applies pre-processing such as A/D conversion and correlated double sampling to an electrical signal output by the image sensor 102, and applies so-called development processing such as white balance adjustment and demosaic processing to the signal to which the pre-processing was applied. Also, various image processing can be executed, for example signal format conversion such as RGB-YCbCr conversion, encoding and decoding according to the recording format, image reduction and enlargement, image compositing, color adjustment, generation of AF evaluation values, or detection and recognition processing of a specific object. A representative specific object is the face of a person, and the recognition processing of the specific object is recognition of an expression or an individual person, but these are not limitations. In the present embodiment, the image processing unit 106 executes detection of motion vectors between a plurality of images.

Note that in the configuration of the digital camera 100 of the present embodiment, combinations of image processing that the image processing unit 106 can apply to an image are registered in advance as patterns, and a pattern to be used can be set from the operation unit 110. Note that at least some of the functions of the image processing unit 106 may be realized with hardware such as an FPGA or an ASIC, or may be realized by a processor included in the image processing unit 106 (or the control unit 103) executing a program, for example.

Figure 2:
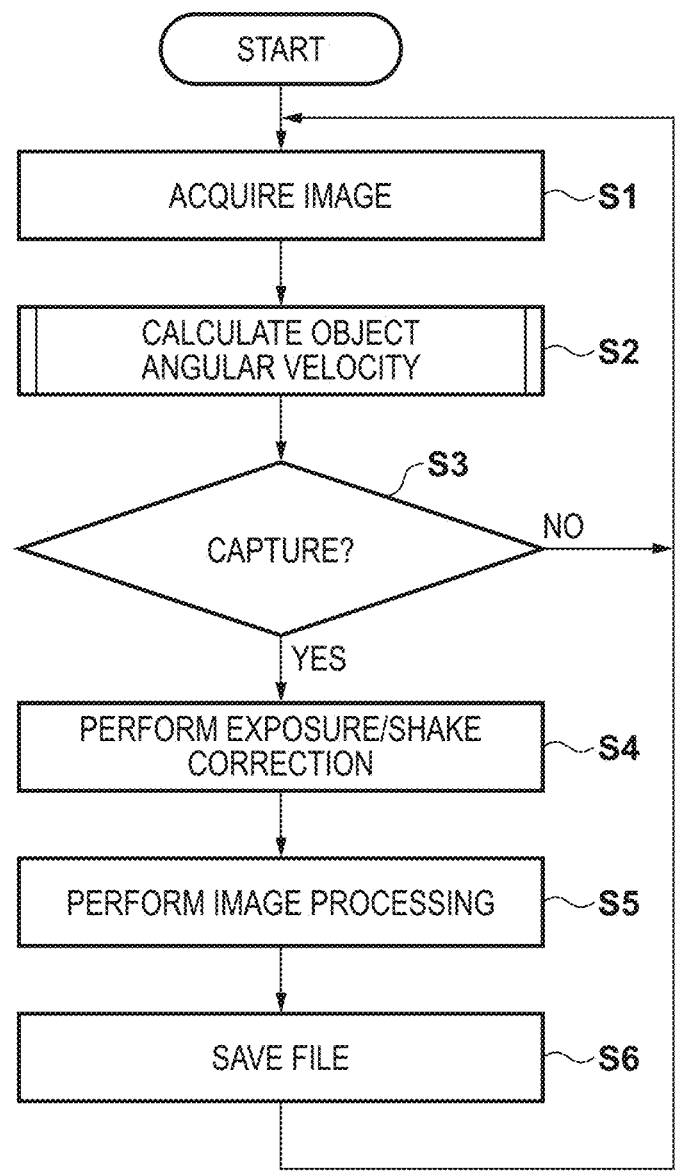
FIG. 2 is a flowchart showing an overview of operation in a capture mode of a digital camera according to an embodiment.

FIG. 2 is a flowchart showing an overview of operation in a capture mode of the digital camera 100. This operation can be started, for example, after starting up the digital camera 100, or when the mode was switched from a playback mode to the capture mode.

In the capture mode, moving image capture for performing live-view display is continuously executed. Exposure control (accumulation time control of the image sensor 102) related to the moving image capture for live-view display, and focus adjustment of the imaging optical system 101, are executed by the control unit 103 based on luminance information and evaluation values obtainable from a frame image obtained in capturing, for example.

In step S1, the control unit 103 reads out a frame image from the image sensor 102, and saves this frame image to the primary storage device 104. The image processing unit 106 reads out the frame image from the primary storage device 104, and generates an image for display (a live-view image). The control unit 103 causes the live-view image to be displayed with the display unit 109. Also, the image processing unit 106 generates AE luminance information and AF evaluation values from the frame image or the live-view image, and outputs these to the control unit 103. The control unit 103 decides the accumulation time (and also capture sensitivity, as necessary) of a next frame based on the luminance information. Also, the control unit 103 decides a focus lens position of the next frame based on the evaluation values, and controls the imaging optical system 101 to drive the focus lens as necessary.

Next, in step S2, the control unit 103 calculates an angular velocity of the object. The details of this calculation will be described later. The control unit 103 can execute shake correction so as to counteract the angular velocity of the object. The control unit 103 can execute the shake correction by driving a shift lens or the image sensor 102, or deciding a read-out area (cropping area) from the image sensor 102. A display indicating the area of the image used for calculation of the angular velocity of the object in step S2 may be displayed superimposed on the live-view image.

Next, in step S3, the control unit 103 determines whether or not a still image capture start instruction has been input through the operation unit 110. The control unit 103 can also determine whether or not a result that can be considered a capture start instruction has been obtained in the image processing unit 106, for example. The control unit 103, for example, in the image processing unit 106, may determine that a capture start instruction has been input when a predetermined specific expression (for example, such as a smile or a wink) of a person has been detected.

If not determined that a capture start instruction has been input, the control unit 103 returns processing to step S1, and repeats the processing of steps S1 and S2.

If determined that a capture start instruction has been input, the control unit 103 advances processing to step S4, and performs capture (exposure) for recording and shake correction. In the capture for recording, the control unit 103, using the shutter included in the imaging optical system 101, controls the exposure time of the image sensor 102, and also controls the size of the opening of the aperture (which may also be used as the shutter). The exposure conditions and the focus lens position can be decided based on the luminance information and the evaluation values generated by the image processing unit 106 from the frame image captured most recently, for example.

The control unit 103 also performs shake correction based on the difference between the angular velocity expressed with a signal that can be input from the shake sensor 105, and the angular velocity of the object calculated in step S2, thereby suppressing object blur. The shake correction can be realized by, based on the above-stated difference, driving the shift lens or the image sensor in a direction orthogonal to the optical axis of the imaging optical system 101, or changing the area of read-out from the image sensor 102. Note that in a case where the shake sensor 105 is provided in the imaging optical system 101, a configuration may be adopted in which the control unit 103 gives the information of the angular velocity of the object calculated in step S2 to the imaging optical system 101, and the shake correction is executed by a control unit provided in the imaging optical system 101.

When exposure ends, the control unit 103 advances processing to step S5, and saves the image signal read out from the image sensor 102 to the primary storage device 104. Then, the image processing unit 106 applies development processing and the like to this image signal, generates an image data file for recording, and saves the data file to the primary storage device 104.

In step S6, the control unit 103 records the image data file that was saved to the primary storage device 104 to the recording medium 107, and returns processing to step S1.

Next, the object angular velocity calculation processing in step S2 in FIG. 2 will be described with reference to the flowchart in FIG. 3.

In step S7, the image processing unit 106 detects a motion vector using two frame images that were obtained at different times by the image sensor 102, and outputs the detection result (motion vector information) to the control unit 103. The control unit 103 saves the motion vector information to the primary storage device 104.

For example, the control unit 103 displays a live-view image generated by the image processing unit 106 with the display unit 109, and also saves this live-view image to the primary storage device 104 such that the live-view image can be used as a previous frame in the next motion vector detection. On the other hand, the image processing unit 106 is capable of detecting a motion vector from a generated live-view image (the current frame) and the live-view image (the previous frame) that was saved to the primary storage device 104. However, it is not necessary to always detect a motion vector for two frame images captured consecutively. Also, a configuration may be adopted in which a motion vector is detected for two frame images that are every other frame in a sequence, such as a first frame and a third frame, or a third frame and a fifth frame. For example, in a case such as where the frame rate is high, a configuration may be adopted in which a motion vector is detected for two frame images in a sequence that are every n-th frame (where n is an integer of 2 or greater).

As the method of detecting a motion vector from two frame images, it is possible to use a well-known template matching method. Among the two frame images, one frame image used as a base (for example, one frame image that was captured earlier) is referred to as a base image, and the other frame image is referred to as a reference image. A rectangular area of a predetermined size in the base image is set as a template frame, and a rectangular area larger than the template frame, for calculating a correlation value in the reference image, is set as a search area for each template frame.

FIG. 4A shows exemplary template frame settings in the present embodiment. Here, eight template frames are set horizontally, and eight template frames are set vertically, for a total of 64 template frames. Note that in the example shown in FIG. 4A, the template frames are arranged such that there are no intervals in the vertical direction, and there are intervals in the horizontal direction, but this sort of arrangement method is not a limitation. For example, the template frames may be arranged such that in both the horizontal direction and the vertical direction there are no intervals, or the template frames may be arranged such that in both the horizontal direction and the vertical direction there are intervals. Also, FIG. 4B shows an exemplary search area setting in the present embodiment. The search area is set such that, for example, the center of the search area matches the corresponding template frame. The size of the search area can be decided based on one or more of a maximum value of the motion vector to be detected, processing performance of the image processing unit 106, and the like.

As schematically shown on the left side in FIG. 4B, the image processing unit 106 moves the image (the template image) in the template frame, within the search area, in steps of a predetermined movement amount (for example one pixel), for example from the upper left to the lower right. Then, the image processing unit 106, in individual positions, calculates a correlation value of the template image and a partial image within the search area corresponding to the template image. The correlation value, for example, may be a sum of absolute difference (SAD) of the value of the corresponding pixel. A position of the template image where a correlation value indicates the highest correlation was obtained is detected by the image processing unit 106 as a movement destination of the template image. The center of the template frame in the base image corresponds to the center of the search area. Accordingly, as the motion vector, the image processing unit 106 detects a vector directed from the center of the search area towards the center of the position of the template image that was detected as the movement destination. However, in the present embodiment, the horizontal component of the motion vector is detected as a horizontal motion vector, and the vertical component of the motion vector is separately detected as a vertical motion vector.

Note that the arrangement (size, quantity, and position) of the template frames and the size of the search area can be read out from the secondary storage device 108 by the control unit 103 when executing step S7, and set in the image processing unit 106. Also, the control unit 103 may use the values read out from the secondary storage device 108 as initial values, and afterward change the values as necessary.

FIG. 4C schematically shows an exemplary data format of motion vector detection results (motion vector information) output to the control unit 103 by the image processing unit 106. Frame numbers are template frame identification information, and for example, frame numbers are assigned beginning with 0 from left to right and from top to bottom. In the case of the template frame (row 6 from the top, and column 3 from the left) shown in the example of FIG. 4A, frame number 50 is assigned.

The magnitude and direction of the horizontal motion vector and the vertical motion vector detected for each template frame are expressed in an 8-bit fixed-point format in pixel units, for example. The maximum value of a detected motion vector is determined by the size of the search area, and is set to +/−96 (pixels) in the present embodiment. The +/− sign indicates the vector direction, with a negative sign indicating the leftward direction and the upward direction, and a positive sign indicating the rightward direction and the downward direction.

Error numbers indicate whether or not the motion vector detection ended normally, and an error classification. Error number 0 indicates normal ending, and an error number other than 0 indicates erroneous ending. Error number 1 indicates that detection was not possible due to low contrast. This error is generated in a case where contrast of the template image or the search area is low, because a high correlation value is obtained at every position. Also, error number 2 indicates repeated pattern detection. This error is generated in a case where a pattern having high frequency and high contrast is included in the template frame and the search area, because a high correlation value is periodically obtained.

Figure 3:
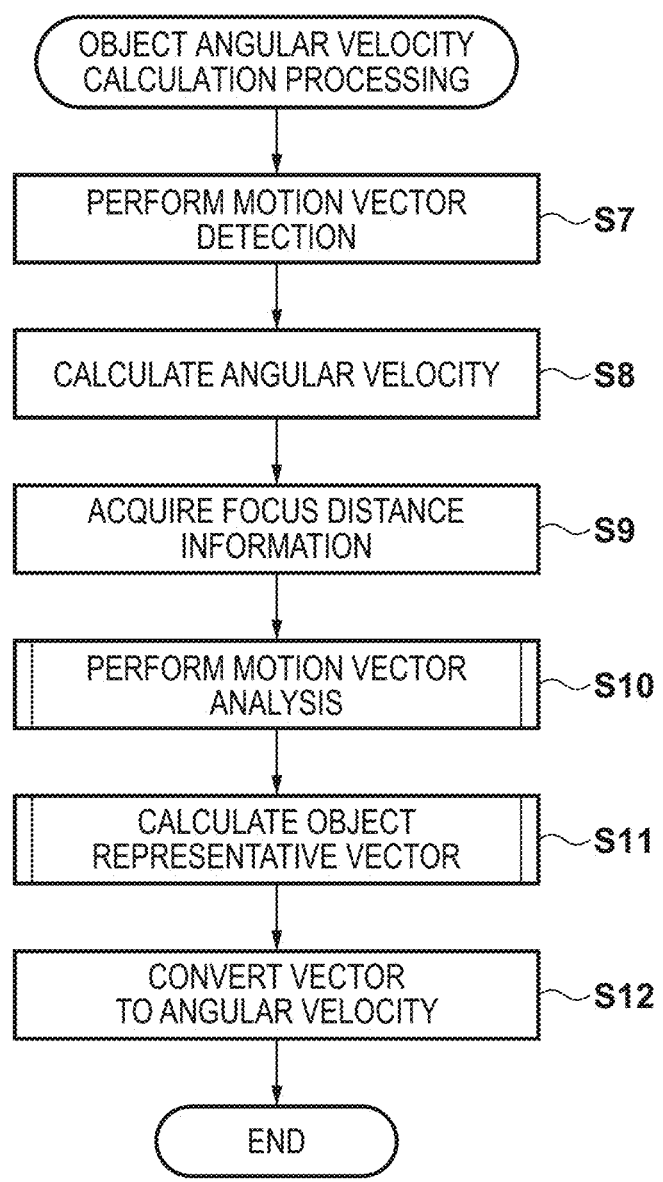
FIG. 3 is a flowchart related to object angular velocity calculation processing in FIG. 2.

Returning to the description of FIG. 3, in step S8, the control unit 103 calculates the angular velocity of the digital camera 100 for each direction component based on the output of the shake sensor 105 and properties (such as sensitivity) of the shake sensor 105 that are stored in the secondary storage device 108, and saves the calculated angular velocity to the primary storage device 104. Here, the control unit 103 may determine whether or not the digital camera 100 is being panned based on the angular velocity. Also, a configuration may be adopted in which, if not determined that the digital camera 100 is being panned, the control unit 103 switches the panning assist function OFF and performs a normal shake correction operation, and if determined that the digital camera 100 is being panned, the control unit 103 switches the panning assist function ON.

In step S9, the control unit 103 acquires focus distance information (angle of view information) from the imaging optical system 101, and saves the focus distance information to the primary storage device 104. If the imaging optical system 101 is a single focus system, a value that has been stored in advance can be used.

In step S10, the control unit 103 executes motion vector analysis processing. The motion vector analysis processing is processing to discriminate the motion vector of the moving object from the motion vector information obtained in step S7, using the angular velocity calculated in step S8 and the focus distance information acquired in step S9. Details of the motion vector analysis processing will be described later.

Next, in step S11, the control unit 103 executes object representative vector detection processing. The object representative vector detection processing calculates an object representative vector from the object motion vector information obtained in step S10 and position information of the focus detection area (AF frame). Details of the object representative vector detection processing will be described later.

Lastly, in step S12, the control unit 103 converts the object representative vector calculated in step S11 to an angular velocity, calculates an object angular velocity in consideration of the angular velocity calculated in step S8, and then ends the object angular velocity calculation processing.

Figure 5:
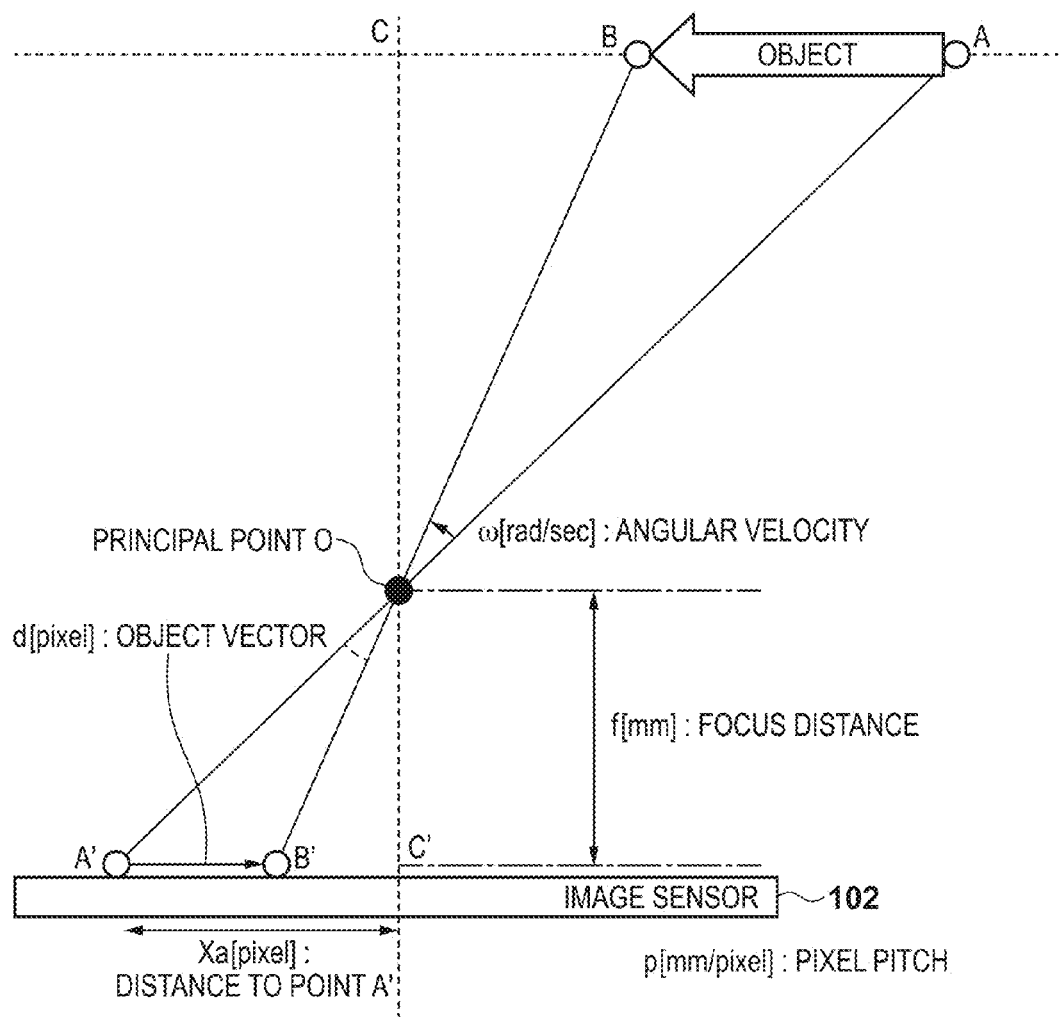
FIG. 5 illustrates a relationship between movement on an imaging plane and angular velocity of an object or a camera in an embodiment.

Here, the method of converting an object representative vector to an angular velocity will be described. FIG. 5 schematically shows the relationship between movement of an object and movement of an object image in the image sensor 102, with regard to the horizontal direction component.

Positions of the image sensor 102 that correspond to a start point and an end point of an object representative vector d calculated in step S11 are respectively represented by A' and B', and the magnitude of the object representative vector d is represented by |d| (pixels). With the principal point of the imaging optical system 101 represented by O, and a position where a straight line that passes through the principal point O is orthogonal to the imaging plane of the image sensor 102 (in other words, a position where the optical axis is orthogonal to the imaging plane) represented by C', an angle A'OB' can be calculated from the difference between an angle A'OC' and an angle B'OC'. Accordingly, the following expression is possible:

Angle $A'OB'$ (rad)=atan($Xa\cdot p/f$) (rad)−atan(($Xa$−|$d$|)$p/f$) (rad)

Here, Xa represents a distance |C'−A'| (pixels) between position C' and position A', f represents the focus distance (mm) of the imaging optical system 101, and p represents pixel pitch (mm/pixel).

When the frame rate of moving image capture is represented by 1/T (frames/sec), the difference in the times when the base image and the reference image were captured is expressed as T·n (sec). Here, n (frames) is the interval between the base image and the reference image, and if the base image and the reference image are consecutive frames, n=1, and if one frame exists between the base image and the reference image, n=2. Here, n=1. Angular velocity is the amount of change over time of an angle, and therefore is expressed with the expression object angular velocity ω=angle A'OB'/T (rad/sec).

Accordingly, it is possible to convert from the object representative vector magnitude |d| (pixels) to the angular velocity ω (rad/sec) using the following Formula (1).

$$\omega = \frac{1}{T} \times \tan^{-1}\left(\frac{f|d|p}{f^2 + (X_a p)^2 - X_a |d| p^2}\right) \quad (1)$$

This conversion is also performed with regard to the vertical direction component of the object representative vector. Note that the rotational direction of the angular velocity obtained in Formula (1) is determined from the direction of the object vector d.

Details of Motion Vector Analysis Processing (S10)

Figure 6A:
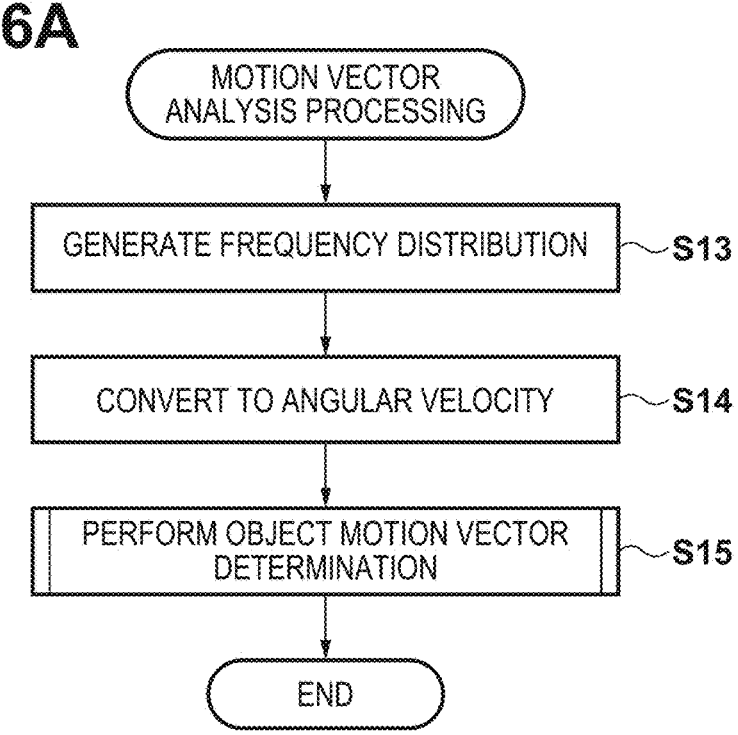
FIGS. 6A and 6B are flowcharts related to motion vector analysis processing in FIG. 3.

Next, details of the motion vector analysis processing in step S10 in FIG. 3 will be described. FIG. 6A is a flowchart of the motion vector analysis processing.

First, in step S13, the control unit 103 creates a frequency distribution (histogram) of the motion vectors detected in step S7. The control unit 103 reads out the motion vector information saved to the primary storage device 104, and regarding properly detected (having error number 0) motion vectors, generates a frequency distribution of the horizontal motion vectors and a frequency distribution of the vertical motion vectors. The control unit 103 saves the two frequency distributions that were generated to the primary storage device 104 as frequency distribution information.

As shown in FIG. 4C, in the motion vector information of the present embodiment, the magnitude and direction of the horizontal motion vectors and the vertical motion vectors are expressed in an 8-bit fixed-point format having a sign. When generating the frequency distributions of the extracted motion vectors, the control unit 103 uses a value in which a fractional portion is rounded off, and a maximum value of 96 is added in order to be handled as an absolute value.

Figure 7A:
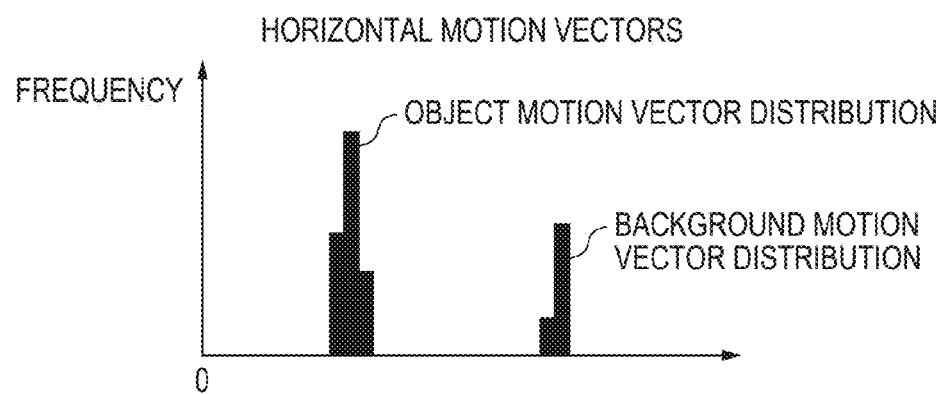
FIGS. 7A and 7B illustrate the motion vector analysis processing in FIG. 3.
Figure 7B:
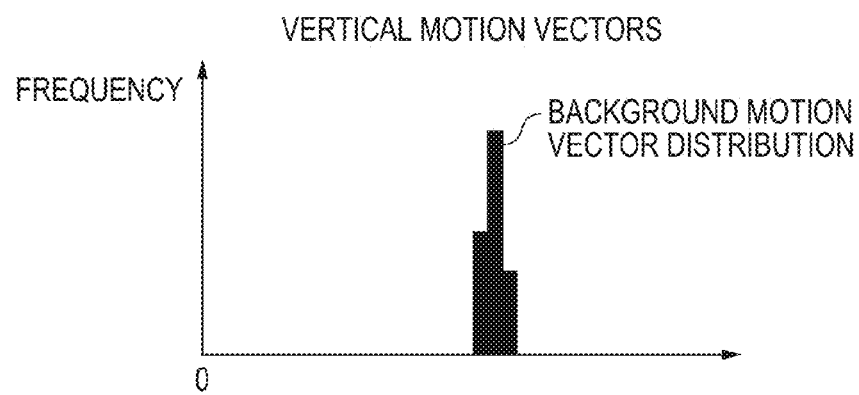

FIGS. 7A and 7B schematically show exemplary frequency distributions generated from motion vector information detected in a state in which the digital camera 100 was being panned in order to capture an object that moves in the horizontal direction. FIG. 7A shows an exemplary frequency distribution of the horizontal motion vectors, and FIG. 7B shows an exemplary frequency distribution of the vertical motion vectors.

Next, in step S14, the control unit 103 converts the angular velocity information that was calculated and saved to the primary storage device 104 in step S8 to a vector quantity. The control unit 103 reads out the angular velocity information from the primary storage device 104. Also, the control unit 103 reads out the focus distance information of the imaging optical system 101 that was acquired and saved to the primary storage device 104 in step S9 from the primary storage device 104. Then, the control unit 103 converts the angular velocity to a vector quantity and saves the vector quantity to the primary storage device 104.

Here, with reference again to FIG. 5, the method of converting an angular velocity to a vector quantity will be described. In the method of converting the magnitude of the object representative vector to an angular velocity in step S12, a description was given in which the digital camera is still and the object is moving, but here, conversely, the object is still and the digital camera is moving with an angular velocity ω. However, because the object is still, the angular velocity ω of the digital camera is equivalent to the apparent angular velocity ω of the object.

When the object position when performing base image capture is represented by A, an image of the object is formed at position A' on the image sensor 102. Also, when the object position when performing reference image capture is represented by B, an image of the object is formed at position B' on the image sensor 102. The magnitude of the vector obtained by converting the angular velocity ω of the digital camera is a distance A'B'(=|d|).

From a time period T and the angular velocity ω of the digital camera, an angle AOB is expressed by ωT.

Here, the movement track of the object is orthogonal to the optical axis at point C'. Also, for the sake of simplicity, it is assumed that the track of the object that passes through position A and position B of the object is parallel to (a fixed distance from) the imaging plane of the image sensor 102.

From the above description, the following expression is possible:

Angle $A'OB'$ (rad)=atan($X_a \cdot p/f$) (rad)−atan(($X_a-|d|)p/f$) (rad)

Also, triangle AOC and triangle A'OC' are homologous, and triangle BOC and triangle B'OC' also are homologous, so angle AOB=ωT=angle A'OB'. Accordingly, a formula for conversion from the angular velocity ω (rad/sec) of the digital camera 100 calculated in step S8 to the magnitude |d| (pixels) of the motion vector can be expressed as in the following Formula (2).

$$|d| = \frac{f^2 \tan(\omega T) + (X_a p)^2 \tan(\omega T)}{fp + X_a p^2 \tan(\omega T)} \quad (2)$$

The control unit 103 converts the magnitude |d| of the motion vector of the digital camera 100 to a vector quantity having a sign corresponding to the direction of rotation of the angular velocity ω, and then saves this vector quantity to the primary storage device 104.

Next, in step S15, the control unit 103 executes object motion vector determination processing. The control unit 103 reads out the frequency distribution information generated in step S13 and the motion vector quantity d calculated in step S14 from the primary storage device 104. Then, based on the motion vector magnitude |d|, the control unit 103 determines the distribution of the background motion vectors and the distribution of the object motion vectors in the frequency distribution. Details of this determination processing will be described later.

The control unit 103 saves information (for example, the template frame numbers in the motion vector information) that specifies the motion vectors determined as motion vectors of the object to the primary storage device 104 as object motion vector information, and then ends the motion vector analysis processing.

Figure 6B:
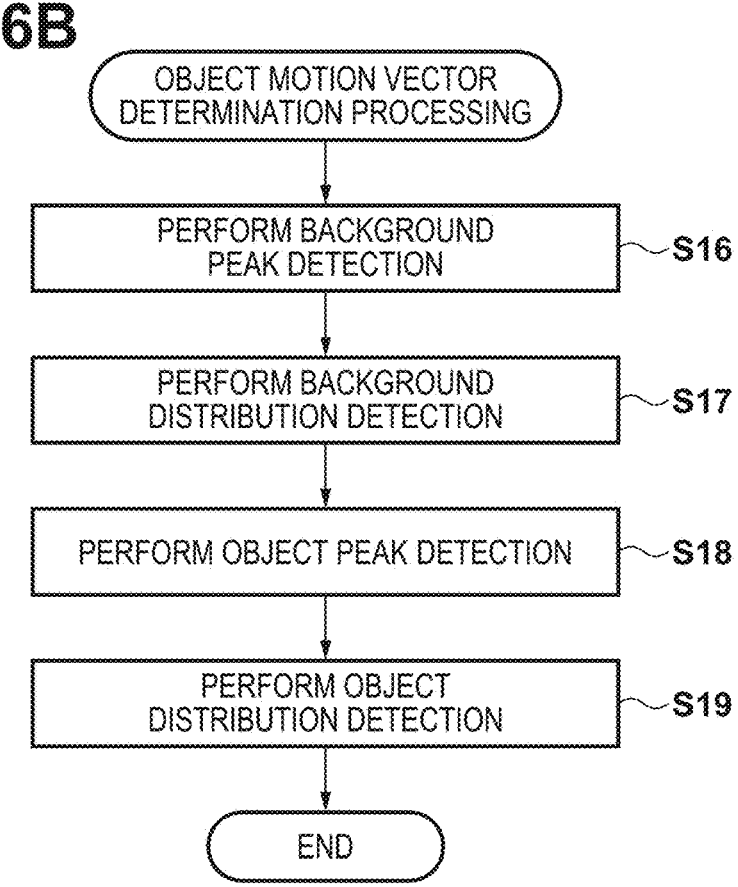

The object motion vector determination processing in step S15 will be further described with reference to the flowchart shown in FIG. 6B.

First, in step S16, the control unit 103 detects a peak (a background peak) of the motion vectors related to the background from the frequency distribution information. The control unit 103 detects the background peak based on the magnitude |d| of a vector (referred to below as a camera vector) obtained by converting the angular velocity of the digital camera 100 in step S14.

Movement of the background corresponds to movement of the digital camera 100, so the control unit 103 detects a vector quantity of maximum frequency that exceeds a predetermined threshold value within a search section centered on the magnitude |d| of the camera vector as the background peak. Note that there may also be cases where a background peak cannot be detected in a section corresponding to the magnitude of the camera vector due to effects such as accuracy of the shake sensor 105, timing of measurement, or the like. Therefore, the control unit 103 detects the background peak within a search section centered on the magnitude of the camera vector. The size of the search area and the threshold value of the frequency can be decided in advance and saved to the secondary storage device 108. Also, a configuration may be adopted in which values saved to the secondary storage device 108 are used as initial values, and changed according to the camera vector magnitude, the focus distance of the imaging optical system 101, an offset amount from a peak section, or the like.

Next, in step S17, the control unit 103 detects the background distribution. As shown in FIGS. 7A and 7B, the magnitude of the motion vectors is distributed having some degree of spread. This spread, for example, is generated by motion vector detection error or rounding error when generating the frequency distribution. The control unit 103 checks the frequency to the left and right of the frequency distribution from the background peak detected in step S16, and detects a range where the frequency does not drop below a threshold value as the background distribution. Note that the threshold value for detecting the background distribution can be decided in advance and saved to the secondary storage device 108. Also, a configuration may be adopted in which values saved to the secondary storage device 108 are used as initial values, and changed according to the background peak frequency, the total frequency of the frequency distribution (total of extracted motion vectors), or the like.

In the exemplary frequency distributions shown in FIGS. 7A and 7B, two distributions (peaks) exist in the frequency distribution of the horizontal motion vector (FIG. 7A). In this case, by the processing in steps S16 and S17, the distribution of the section having the larger value is detected as the background distribution.

Similarly, the single distribution existing in the frequency distribution of the vertical motion vector (FIG. 7B) also is detected as the background distribution.

The control unit 103, for example, saves information (for example, a frame number) that specifies a motion vector corresponding to the background distribution detected in step S17 to the primary storage device 104 as background vector information. The control unit 103 saves the background vector information such that the motion vector corresponding to the background peak can be discriminated.

Next, in step S18, the control unit 103 detects an object peak. The control unit 103 detects peaks in sections other than the section where the background distribution was detected in step S17, and uses a peak that exceeds a threshold value as the object peak. Note that the threshold value used in step S16 may be adopted as the threshold value used here, or another value may be used.

Lastly, in step S19, the control unit 103 detects an object distribution. The object distribution can be detected by the same method as the detection of the background distribution in step S17, however the threshold value may be changed.

The control unit 103 saves information (for example, a frame number) that specifies a motion vector corresponding to the object distribution detected in step S19 to the primary storage device 104 as object vector information. The control unit 103 saves the object vector information such that the motion vector corresponding to the object peak can be discriminated.

Note that in a case where there are two motion vector distributions in the frequency distribution, for example in a case where the digital camera 100 is being panned, distributions may be discriminated such that the distribution for a section having a larger range or width is discriminated as the background distribution, and the distribution for a section having a smaller range or width is discriminated as the object distribution.

Details of Object Motion Vector Detection Processing (S11)

Figure 8:
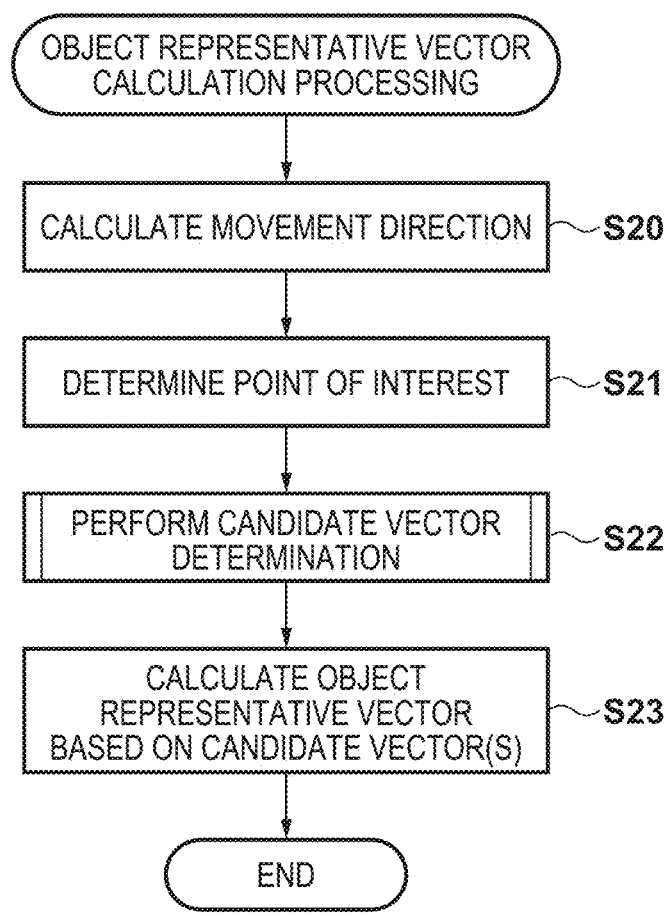
FIG. 8 is a flowchart related to object representative vector calculation processing in FIG. 3.

Next, details of the object representative vector calculation processing in step S11 in FIG. 3 will be described with reference to the flowchart in FIG. 8.

In step S20, the control unit 103 calculates the movement direction of the object according to the following procedure. The control unit 103 refers to the object motion vector information saved to the primary storage device 104, and reads out the motion vector information that corresponds to the object peaks in the horizontal direction and the vertical direction. Also, the control unit 103 reads out the information of the camera vectors in the horizontal direction and the vertical direction from the primary storage device 104.

The control unit 103 calculates the movement direction of the object with the following Formula (3). Here, the motion vector that corresponds to the object peak in the horizontal direction is represented by Vph, the motion vector that corresponds to the object peak in the vertical direction is represented by Vpv, the camera vector in the horizontal direction is represented by Voh, and the camera vector in the vertical direction is represented by Vov.

$$\alpha = \frac{V_{ov} - V_{pv}}{V_{oh} - V_{ph}} \quad (3)$$

When a positive sign represents the angular velocity obtained when the digital camera 100 was panned in the rightward direction or the downward direction, the sign is inverse to the sign of the camera vectors, so in the expression of Formula (3) the camera vectors are subtracted. In this way, the control unit 103 calculates a slope α relative to the horizontal direction as a value that expresses the movement direction.

Next, in step S21, the control unit 103 determines a point of interest that is a position within the image, based on the position information of the focus detection area that was read out from the primary storage device 104. In the present embodiment, as the point of interest, the control unit 103 adopts center coordinates of a template frame having the shortest center coordinate distance from the focus detection area that is set.

In step S22, the control unit 103 (a candidate vector determination unit) determines candidate vectors from the object motion vector information read out from the primary storage device 104, the object movement direction calculated in step S20, and the point of interest determined in step S21, and extracts the determined candidate vectors. Details of the candidate vector determination processing will be described later.

Lastly, in step S23, the control unit 103 calculates an objective representative vector based on the candidate vectors extracted in step S22. The control unit 103 can calculate an object representative vector by averaging candidate vectors, for example, but another method may also be used. The control unit 103 saves information of the calculated object representative vector to the primary storage device 104.

Details of Candidate Vector Determination Processing (S22)

Figure 9A:
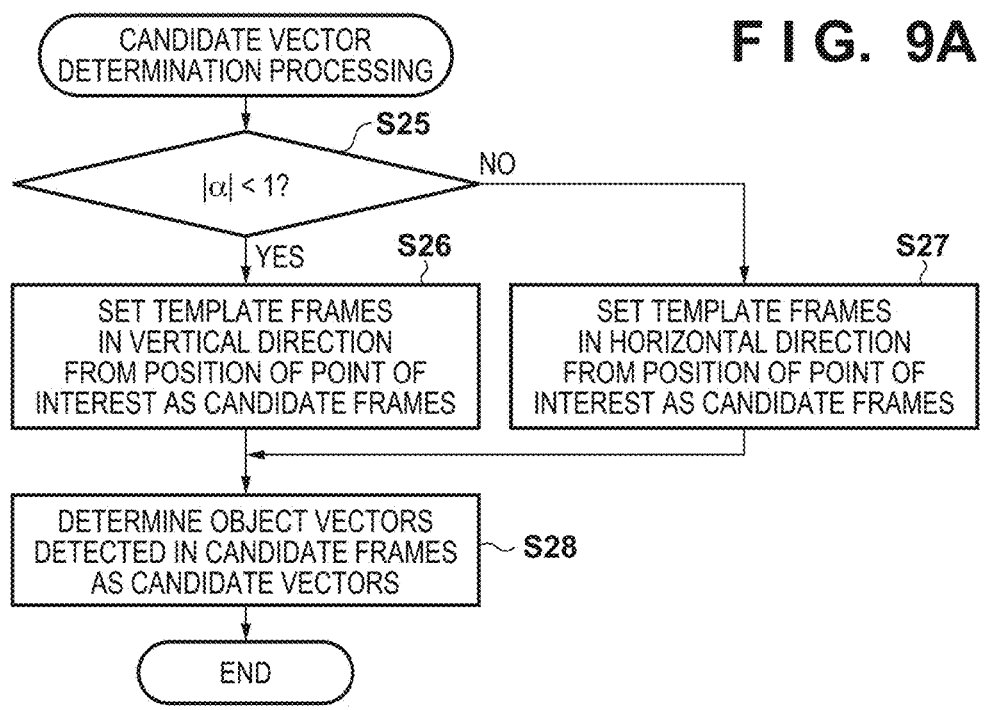
FIGS. 9A and 9B illustrate candidate vector determination processing in FIG. 8.

Next, details of the candidate vector determination processing in step S22 will be described with reference to FIGS. 9A and 9B. FIG. 9A is a flowchart of the candidate vector determination processing.

First, in step S25, the control unit 103 forks processing according to the movement direction of the object calculated in step S20. Specifically, the control unit 103 determines whether or not the absolute value of the slope α calculated in step S20 is less than 1, and if determined that the absolute value of the slope α is less than 1, the control unit 103 advances processing to step S26, and if not determined that the absolute value of the slope α is less than 1, the control unit 103 advances processing to step S27.

When the absolute value of the slope α is less than 1, the control unit 103 considers the movement direction of the object to be the horizontal direction. Then, in step S26, among the template frame determined to be the point of interest in step S21 and template frames adjacent to this template frame in the vertical direction, the control unit 103 sets template frames where an object motion vector was detected as candidate frames.

On the other hand, when the absolute value of the slope α is 1 or greater, the control unit 103 considers the movement direction of the object to be the vertical direction. Then, in step S27, among the template frame determined to be the point of interest in step S21 and template frames adjacent to this template frame in the horizontal direction, the control unit 103 sets template frames where an object motion vector was detected as candidate frames.

The reason for setting candidate frames in this manner is that a change in acceleration due to image height is greater in the direction parallel to the movement direction of the object, and smaller in the direction orthogonal to the movement direction of the object. Accordingly, by setting candidate frames in this manner, it is possible to calculate a highly reliable object representative vector based on a motion vector group similar to a motion vector that can be detected at the point of interest.

In step S28, the control unit 103 determines the object motion vectors detected in the candidate frames set in step S26 or S27 as candidate vectors. The control unit 103 extracts the information of the candidate vectors from the object motion vector information, and saves the extracted candidate vector information to the primary storage device 104.

Figure 9B:
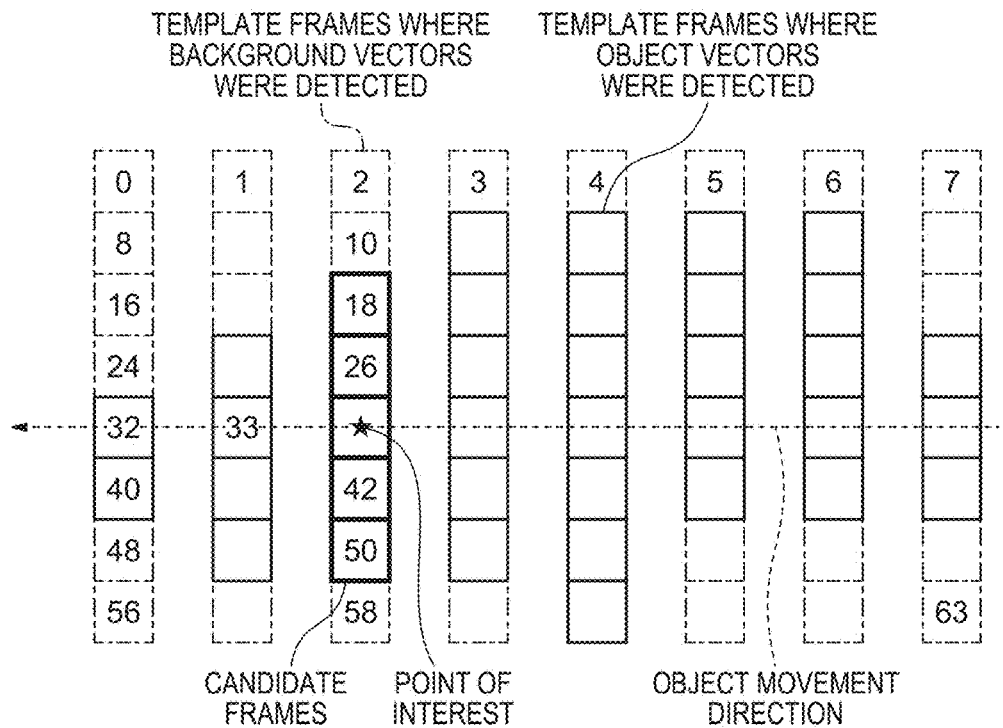

FIG. 9B schematically shows a candidate vector determination operation in a case where the slope α is 0 (the movement direction of the object is the horizontal direction). Here, template frames are presumed to be arranged in the same manner as in FIG. 4A.

In FIG. 9B, template frames where motion vectors determined to be background vectors in step S17 were detected are shown with broken lines, and template frames where motion vectors determined to be object vectors in step S19 were detected are shown with solid lines. In this example, α is 0, and the movement direction of the object is the horizontal direction from right to left.

In such a case, in the candidate vector determination processing in FIG. 9A, the slope α is 0, so the control unit 103 advances processing from step S25 to step S26. In step S26, because the point of interest is the center coordinates of frame number 34, the control unit 103 sets as candidate frames the template frames of frame numbers 18, 26, 34, 42, and 50, which are indicated with thick frames. In step S28, the control unit 103 determines the object motion vectors detected in the candidate frames as candidate vectors. Then, the control unit 103 extracts the information of the candidate vectors from the object motion vector information, and saves the extracted candidate vector information to the primary storage device 104.

As described above, in the present embodiment, representative vectors of an object are calculated based on, among the detected object vectors, object vectors that were selected according to the position of the focus detection area and the movement direction of the object. Therefore, it is possible to obtain object representative vectors that express the angular velocity of the object in the vicinity of the focus detection area. The focus detection area is an area where the user desires to focus, so in a case of performing panning, this is an area the user desires to be still. Accordingly, by performing shake correction so as to counteract the angular velocity expressed by the object representative vectors obtained in the present embodiment, it is possible to realize a function of assisting capture of a panning image desired by the user. Accordingly, without considering the position of the focus detection area, it is possible to realize more remarkable effects than in a case where all of the detected object vectors are averaged and used as an object representative vector.

Second Embodiment

Next, a second embodiment of the present invention will be described. The present embodiment differs from the first embodiment in the point of interest determination (step S21) and the candidate vector determination processing (step S22) in the object motion vector detection processing (FIG. 8). Accordingly, a description of the functional configuration of the digital camera 100 and other processing is omitted here, and mainly processing unique to the present embodiment is described.

In the point of interest determination processing in the first embodiment, center coordinates of a template frame having the shortest center coordinate distance from the focus detection area are adopted as the point of interest, but in the present embodiment, the center coordinates of the focus detection area are adopted as the point of interest. In this case, when a template frame whose center coordinates are to be used as the point of interest does not exist, any of a template frame positioned forward and a template frame positioned rearward of the point of interest in the movement direction is selected as a template frame to serve as a base for setting candidate frames.

For example, trains and automobiles are representative moving objects that are a target of panning. When panning on trains and automobiles, the user often attempts to obtain an image in which a head portion of the object has been made still. The head portion is a head car in the case of a train, and is a bumper, a hood, or the like in the case of an automobile. Therefore, in the present embodiment, in a case where a template frame whose center coordinates are to be used as the point of interest does not exist, a template frame positioned forward of the point of interest in the movement direction is selected as a template frame to serve as a base for setting candidate frames.

Figure 10A:
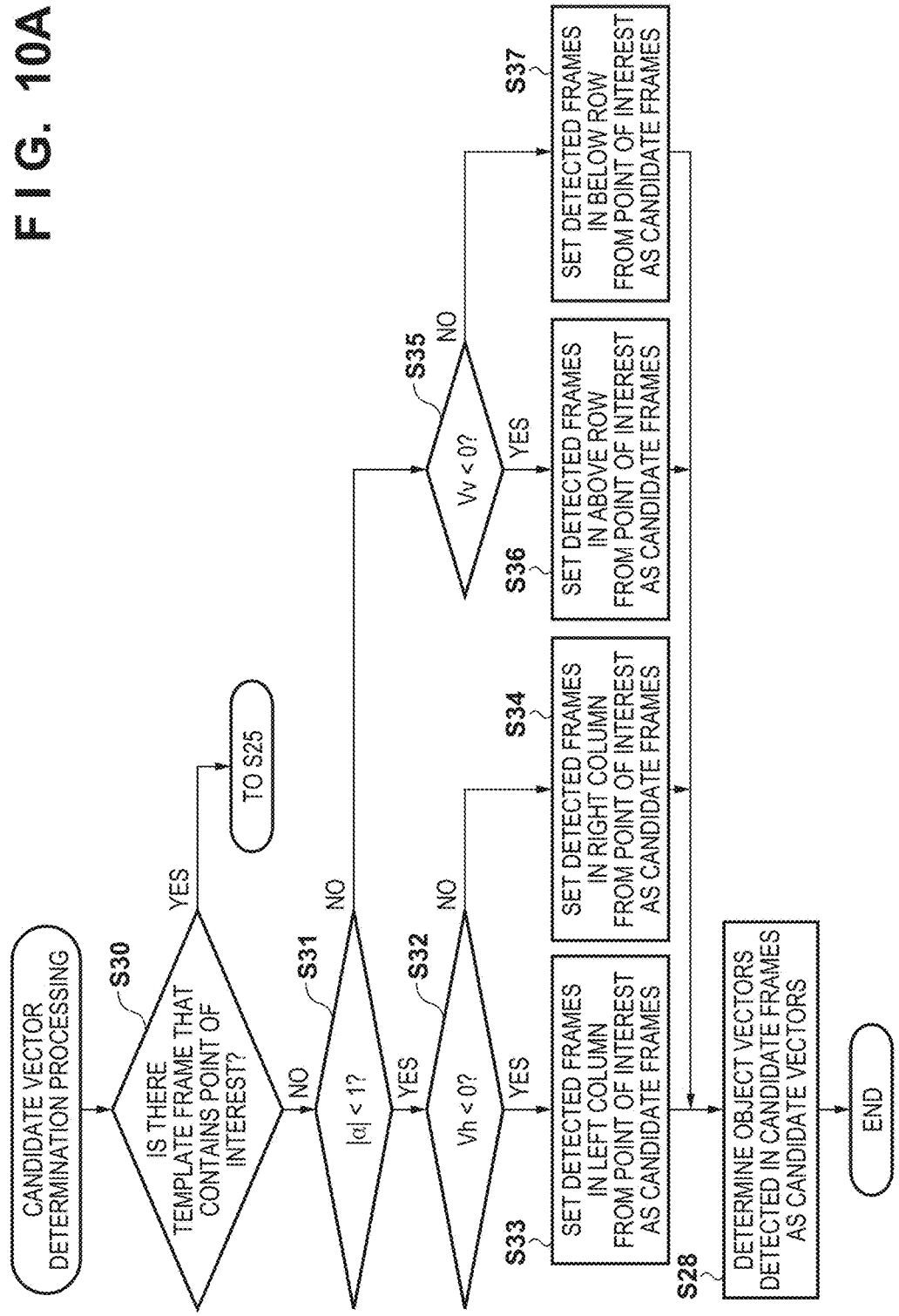
FIGS. 10A and 10B illustrate candidate vector determination processing according to a second embodiment.

FIG. 10A is a flowchart of the candidate vector determination processing in the present embodiment.

In step S30, the control unit 103 determines whether or not a template frame that contains the point of interest (here, the center coordinates of the focus detection area) exists, and if determined that such a template frame exists, similar candidate vector determination processing as in the first embodiment is executed.

On the other hand, if not determined that a template frame that contains the point of interest exists, the control unit 103 advances processing to step S31 and determines whether or not the absolute value of the slope α calculated in step S20 is less than 1, and if determined that the absolute value of the slope α is less than 1, the control unit 103 advances processing to step S32, and if not determined that the absolute value of the slope α is less than 1, the control unit 103 advances processing to step S35.

When the absolute value of the slope α is less than 1, the control unit 103 considers the movement direction of the object to be the horizontal direction. Then, in step S32, the control unit 103 determines whether or not the sign of the horizontal direction object vector Vh (=Vph−Voh) is negative, and if the sign is determined to be negative, advances processing to step S33, and if the sign is not determined to be negative, advances processing to step S34.

When the sign of the horizontal direction object vector Vh is negative, the movement direction of the object is the leftward direction. Accordingly, in step S33, among the nearest template frame column on the left side of the point of interest, the control unit 103 sets as candidate frames template frames where an object vector is detected.

When the sign of the horizontal direction object vector Vh is positive, the movement direction of the object is the rightward direction. Accordingly, in step S34, among the nearest template frame column on the right side of the point of interest, the control unit 103 sets as candidate frames template frames where an object vector is detected.

Figure 10B:
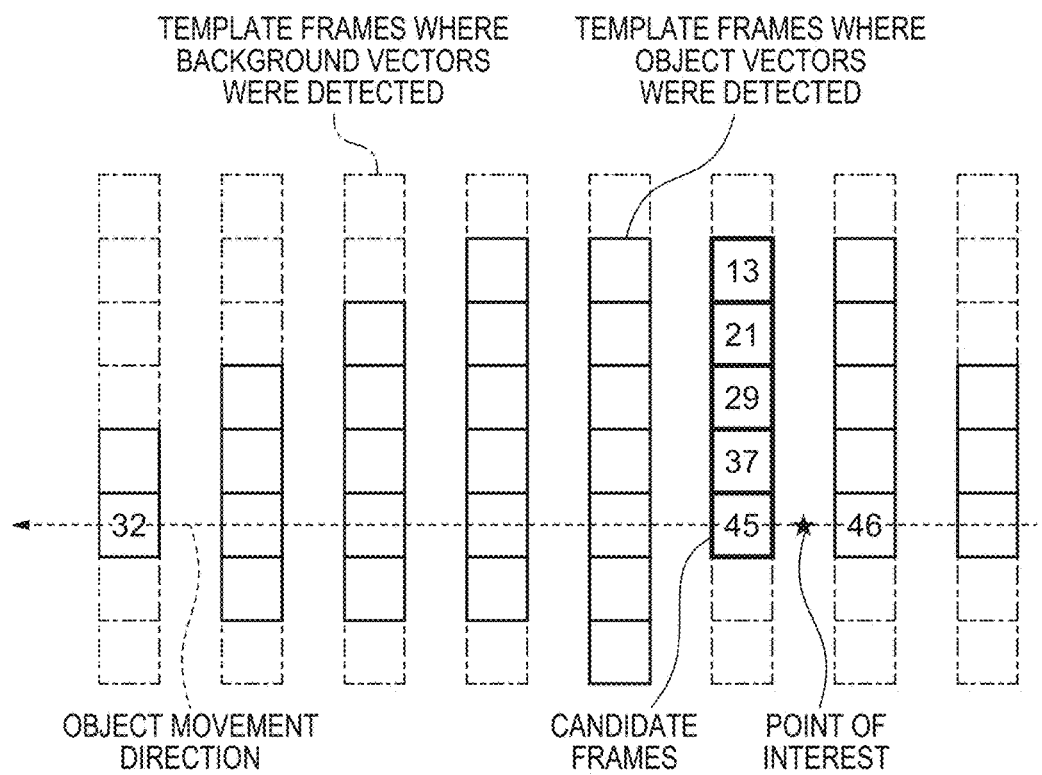

FIG. 10B schematically shows a candidate vector determination operation in a case where the slope α is 0 (the movement direction of the object is the horizontal direction) and the sign of the horizontal direction object vector Vh is negative. Here, template frames are presumed to be arranged in the same manner as in FIG. 4A.

The point of interest exists between frame numbers 45 and 46, and the sign of the horizontal direction object vector Vh is negative, so in the column of the nearest frame number 45 on the left side of the point of interest, template frames of frame numbers 13, 21, 29, 37, and 45 where an object vector is detected are set as candidate frames.

On the other hand, if not determined that the absolute value of the slope α is less than 1 in step S31, the control unit 103 considers the movement direction of the object to be the vertical direction. Then, in step S35, the control unit 103 determines whether or not the sign of the vertical direction object vector Vv (=Vpv−Vov) is negative, and if the sign is determined to be negative, advances processing to step S36, and if the sign is not determined to be negative, advances processing to step S37.

When the sign of the vertical direction object vector Vv is negative, the movement direction of the object is the upward direction. Accordingly, in step S36, among the nearest template frame row on the upper side of the point of interest, the control unit 103 sets as candidate frames template frames where an object vector is detected.

When the sign of the vertical direction object vector Vv is positive, the movement direction of the object is the downward direction. Accordingly, in step S37, among the nearest template frame row on the lower side of the point of interest, the control unit 103 sets as candidate frames template frames where an object vector is detected.

In this way, in the present embodiment, when a template frame that contains the point of interest does not exist, a template frame existing forward in the movement direction of the object is used as a base when setting candidate frames. Therefore, even in a case where the point of interest is not within a template frame, it is highly likely that it will be possible to calculate an object representative vector that expresses the angular velocity at a position as intended by the user. Accordingly, by performing shake correction so as to counteract the angular velocity expressed by the object representative vectors obtained in the present embodiment, it is possible to realize a function of assisting capture of a panning image desired by the user.

Third Embodiment

Next, a third embodiment of the present invention will be described. The present embodiment differs from the first and second embodiments in the candidate vector determination processing (step S22) in the object motion vector detection processing (FIG. 8). Accordingly, a description of the functional configuration of the digital camera 100 and other processing is omitted here, and mainly processing unique to the present embodiment is described.

In the first and second embodiments, the movement direction of the object is considered to be the horizontal direction when the absolute value of the slope α is less than 1, and the movement direction of the object is considered to be the vertical direction when the absolute value of the slope α is 1 or greater. On the other hand, in the present embodiment, candidate vector determination processing is executed for movement in a diagonal direction according to the slope α.

Figure 11A:
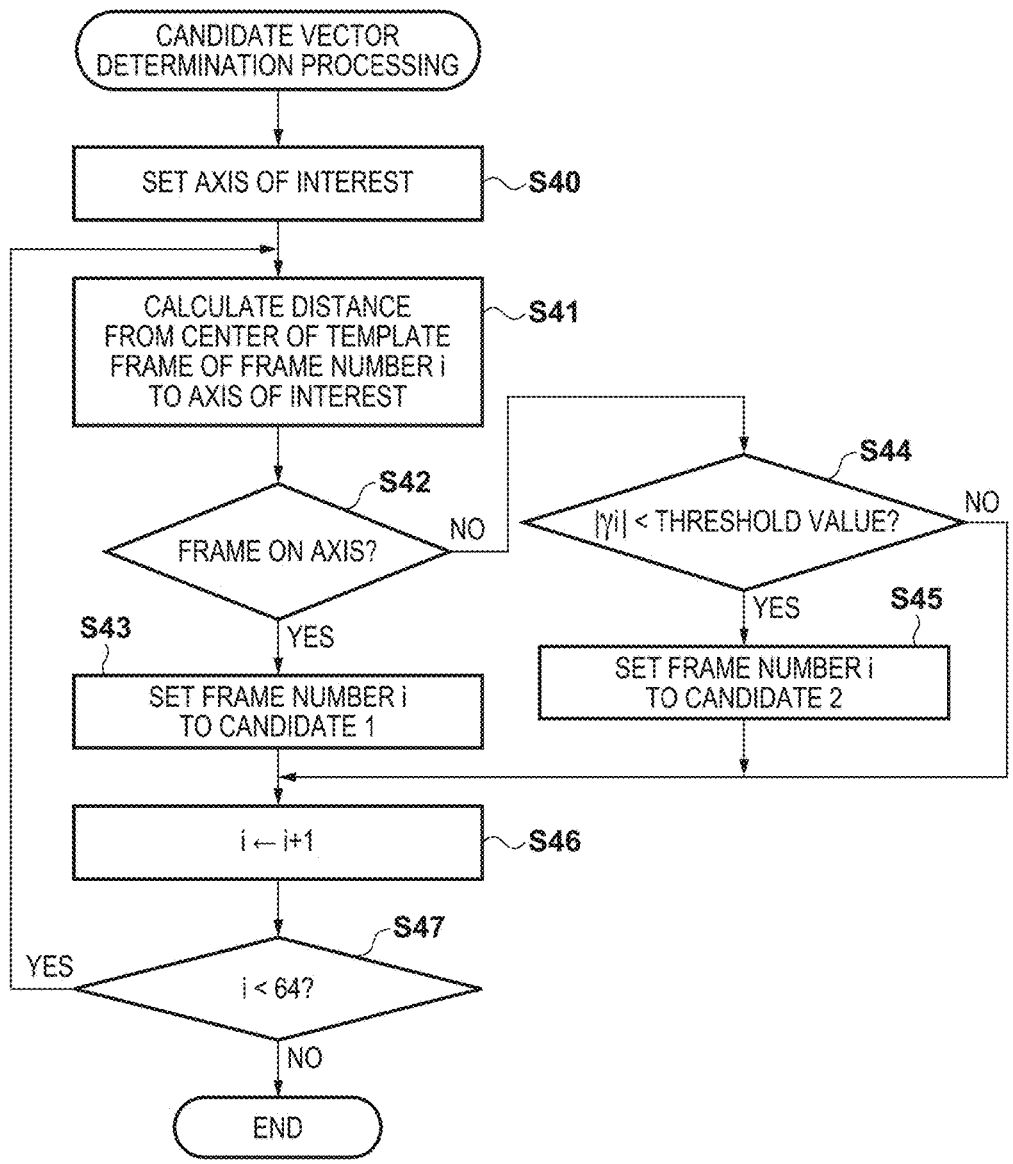
FIGS. 11A and 11B illustrate candidate vector determination processing according to a third embodiment.

FIG. 11A is a flowchart of the candidate vector determination processing in the present embodiment.

In step S40, the control unit 103 sets an axis of interest. The axis of interest is a straight line that passes through the point of interest and is orthogonal to the movement direction of the object. When using the slope α that was calculated in step S20, a slope β of the axis of interest can be expressed with below Formula (4).

$$\beta = -\frac{1}{\alpha} \quad (4)$$

Also, because the axis of interest is a straight line that passes through the point of interest, when the x, y coordinates of the point of interest are represented by (Ix, Iy), an intercept ξ of a primary function expressing the axis of interest can be expressed with below Formula (5).

$$\xi = I_y + \frac{I_x}{\alpha} \quad (5)$$

In step S41, the control unit 103 calculates the distance from the center to the axis of interest, with respect to one template frame (represented by frame number i). When the center coordinates of the template frame of frame number i are represented by (Cx, Cy), a distance γi can be expressed with below Formula (6).

$$\gamma_i = \{\alpha(C_y - I_y) + (C_x - I_x)\} \times \cos\theta \quad (6)$$

Note that angle θ is calculated with $\tan^{-1}\alpha$.

In step S42, the control unit 103 determines whether or not the template frame of frame number i is on the axis of interest. The control unit 103 determines that the template frame of frame number i is on the axis of interest when, for example, the absolute value of the distance γi is less than the size (for example, ½ of a diagonal) of the template frame.

When determined that the template frame is on the axis of interest, the control unit 103 advances processing to step S43, sets the template frame of frame number i as a first candidate frame, and then advances processing to step S46. A motion vector detected in the first candidate frame contributes more than a motion vector detected in a second candidate frame described later when used for calculation of an object representative vector. For example, when an object representative vector is calculated by obtaining a weighted average of candidate vectors, the candidate vector detected in the first candidate frame is given a greater weight (coefficient) than the candidate vector detected in the second candidate frame. As one example, the candidate vector detected in the first candidate frame is given a weight of 100% (a coefficient of 1.0).

On the other hand, when not determined that the template frame of frame number i is on the axis of interest, the control unit 103 advances processing to step S44, and determines whether or not the distance γi is less than a threshold value. Note that, as in the second embodiment, in a case where template frames that exists forward in the movement direction of the object are set as candidate frames, the distance γi is compared to the threshold value when γi has the same sign as the horizontal direction object vector Vh. Accordingly, when γi has a different sign than the horizontal direction object vector Vh, the control unit 103 may skip step S44 and advance processing to step S46.

Note that the threshold value used in step S44 may be saved in advance to the secondary storage device 108. Also, a configuration may be adopted in which the threshold value saved to the secondary storage device 108 is used modified based on at least one of the focus distance when performing capture, exposure time, and an approximate object angular velocity calculated from an object peak.

When determined in step S44 that the distance γi is less than the threshold value, the control unit 103 advances processing to step S45, sets the template frame of frame number i as the second candidate frame, and then advances processing to step S46. The motion vector detected in the second candidate frame contributes less than the motion vector detected in the first candidate frame when used for calculation of the object representative vector. For example, when an object representative vector is calculated by obtaining a weighted average of candidate vectors, the candidate vector detected in the second candidate frame is given a smaller weight (coefficient) than the candidate vector detected in the first candidate frame. As one example, the candidate vector detected in the second candidate frame is given a weight of 50% (a coefficient of 0.5).

When not determined in step S44 that the distance γi is less than the threshold value, the control unit 103 advances processing to step S46.

In step S46, the control unit 103 adds 1 to the frame number i, and advances processing to step S47. In step S47, the control unit 103 determines whether or not the frame number i is less than 64 (the quantity of template frames), and if determined that the frame number i is less than 64, the control unit 103 returns processing to step S41, and if not determined that the frame number i is less than 64, the control unit 103 ends processing.

Figure 11B:
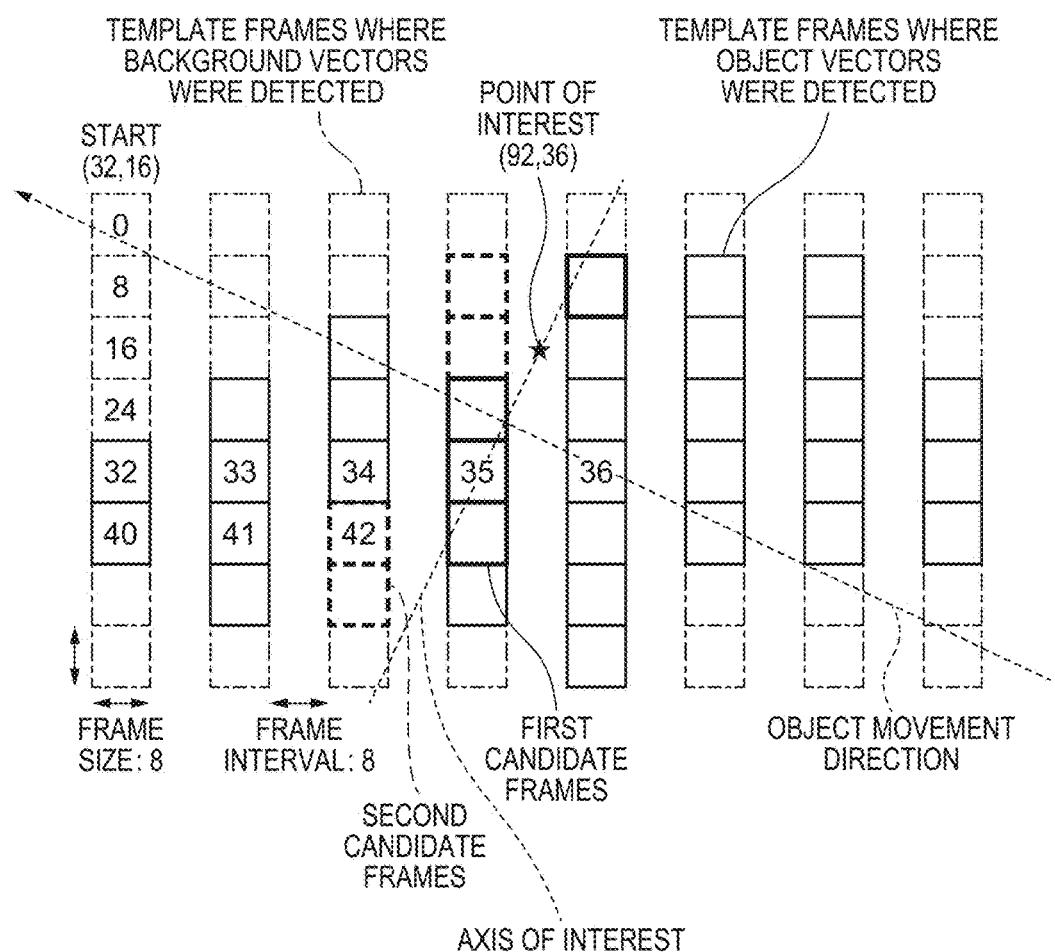

FIG. 11B schematically shows an example of candidate vector determination in the present embodiment. In this example, the center coordinates of frame number 0 are (32, 16), the length of one side of the template frame and an interval in the horizontal direction are set to 8, the coordinates of the point of interest are (92, 36), and the slope α is set to 0.5. In this case, the slope β of the axis of interest is −2, the intercept ξ is 220, and cos θ in Formula (6) is 0.8944.

FIG. 12 shows center coordinates of some of the template frames in the example in FIG. 11B, and the distance γi from the axis of interest. For example, in frame number 35, the axis of interest passes through the center coordinates, so the distance γi is 0. In FIG. 11B, the template frames of frame numbers 12, 27, 35, and 43 indicated by thick lines are set as first candidate frames, and the template frames of frame numbers 11, 19, 42, and 50 indicated by thick broken lines are set as second candidate frames. Note that the threshold value used in step S44 is set to 12.

In this way, in the present embodiment, when a template frame that contains the point of interest does not exist, a template frame existing forward in the movement direction of the object is used as a base when setting candidate frames. Therefore, even in a case where the point of interest is not within a template frame, it is highly likely that it will be possible to calculate an object representative vector that expresses the angular velocity at a position as intended by the user. Accordingly, by performing shake correction so as to counteract the angular velocity expressed by the object representative vector obtained in the present embodiment, it is possible to realize a function of assisting capture of a panning image desired by the user.

In this way, in the present embodiment, a configuration is adopted in which candidate frames are set based on the distance from the axis of interest that is orthogonal to the movement direction of the object and passes through the point of interest. Therefore, even in a case where the object is moving diagonally, it is possible to calculate an object representative vector from the point of interest and motion vectors that express the angular velocity of the object in the vicinity of the point of interest. Therefore, by driving the shift lens or the image sensor so as to counteract the angular velocity expressed by the object representative vector obtained in the present embodiment, and shifting the range where the image is read out from the image sensor, it is possible to realize a function of assisting capture of a panning image desired by the user.

Other Embodiments

In the above-described embodiments, the position of the focus detection area used when performing capture of the base image or the reference image was used as the base for determining the point of interest, but another base may also be used. For example, the position of a face area detected in the base image or the reference image, the position of a face area of a person recognized in the base image or the reference image, or the like may also be used. Also, a position designated by the user through the operation unit 110 may be used. Also, a position based on a distance map or a depth map of the base image or the reference image, for example a position at a nearest distance, may be used as the point of interest.

Also, in the above-described embodiments, for ease of description and understanding, a case was described where the panning assist function is always enabled. However, a configuration may also be adopted in which the panning assist function is enabled only when determined that the digital camera 100 is being panned. In this case, when not determined that the digital camera 100 is being panned, it is possible to perform shake correction based on the angular velocity of the digital camera 100 obtained from a background vector.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-236994, filed on Dec. 3, 2015, which is hereby incorporated by reference herein in its entirety.

What is claimed is:

1. A motion vector detection apparatus, comprising:
a processor that executes a program stored in a memory and functions as:
a detecting unit adapted to detect, for each of a plurality of areas of a base image, a motion vector relative to a reference image;
a motion vector determining unit adapted to determine, among motion vectors, motion vectors related to a moving object;
a candidate vector determining unit adapted to determine, based on a point of interest that is a position within an image and a movement direction of the moving object, one or more of the motion vectors related to the moving object as candidate vector(s); and a calculating unit adapted to calculate a representative vector of the moving object based on the candidate vector(s), wherein the candidate vector determining unit determines, from among the motion vectors related to the moving object, one or more motion vectors each being detected in, among the plurality of areas, an area that exists on an axis of interest that extends in a different direction from the movement directions of the moving object and passes through the point of interest, as the candidate vector(s).

2. The motion vector detection apparatus according to claim 1,
wherein the candidate vector determining unit determines, from among the motion vectors related to the moving object, one or more motion vectors each being detected in, among the plurality of areas, an area of which distance from the point of interest is less than a threshold value, as the candidate vector(s).

3. The motion vector detection apparatus according to claim 1,
wherein the candidate vector determining unit determines, from among the motion vectors related to the moving object, one or more motion vectors each being detected in, among the plurality of areas, either an area of which distance from the point of interest is less than a threshold value, or an area that exists in a direction orthogonal to the movement direction of the moving object from the area, as the candidate vector(s).

4. The motion vector detection apparatus according to claim 1,
wherein the axis of interest extends in a direction orthogonal to the movement direction of the moving object.

5. The motion vector detection apparatus according to claim 4,
wherein the candidate vector determining unit also determines, from among the motion vector related to the moving object, one or more motion vectors each being detected in, among the plurality of areas, an area where a distance from the axis of interest is less than a threshold value, as the candidate vector(s).

6. The motion vector detection apparatus according to claim 1,
wherein the candidate vector determining unit determines, from among motion vectors related to the moving object, one or motion vectors each being detected in, among the plurality of areas, an area that exists forward in the movement direction of the moving object, as the candidate vector(s).

7. The motion vector detection apparatus according to claim 1,
wherein the point of interest is any of a focus detection area used when performing capture of the base image or the reference image, a face area detected in the base image or the reference image, a position of a face area of a person recognized in the base image or the reference image, a position based on a depth map of the base image or the reference image, and a position designated by a user.

8. The motion vector detection apparatus according to claim 1,
wherein the motion vector determining unit determines the motion vectors related to the moving object using a frequency distribution of magnitude of the motion vectors detected by the detecting unit.

9. The motion vector detection apparatus according to claim 8,
wherein the motion vector determining unit determines, among distributions in the frequency distribution, a second distribution in a section having a smaller range than a first distribution, to be a distribution of motion vectors related to the moving object.

10. An image capture apparatus, comprising:
a processor that executes a program stored in a memory and functions as:
a motion vector detection apparatus that comprises:
a detecting unit adapted to detect, for each of a plurality of areas of a base image, a motion vector relative to a reference image;
a motion vector determining unit adapted to determine, among motion vectors, motion vectors related to a moving object;
a candidate vector determining unit adapted to determine, based on a point of interest that is a position within an image and a movement direction of the moving object, one or more of the motion vectors related to the moving object as candidate vector(s); and
a calculating unit adapted to calculate a representative vector of the moving object based on the candidate vector(s);
a converting unit adapted to convert the representative vector to an angular velocity; and
a correcting unit adapted to execute shake correction based on the angular velocity,
wherein the candidate vector determining unit determines, from among the motion vectors related to the moving object, one or more motion vectors each being detected in, among the plurality of areas, an area that exists on an axis of interest that extends in a different direction from the movement direction of the moving object and passes through the point of interest, as the candidate vector(s).

11. The image capture apparatus according to claim 10,
wherein the correcting unit executes the shake correction by moving at least one of a lens included in an imaging optical system and an image sensor included in the image capture apparatus in a direction being different from a direction of an optical axis of the imaging optical system according to the angular velocity.

12. The image capture apparatus according to claim 10,
wherein the correcting unit executes the shake correction by moving an area where an image is read out from an image sensor included in the image capture apparatus according to the angular velocity.

13. A method of controlling a motion vector detection apparatus, comprising:
detecting, for each of a plurality of areas of a base image, a motion vector relative to a reference image;
determining, among motion vectors, motion vectors related to a moving object;
determining, based on a point of interest that is a position within an image and a movement direction of the moving object, one or more of the motion vectors related to the moving object as candidate vector(s); and
calculating a representative vector of the moving object based on the candidate vector(s),
wherein the determining motion vectors related to a moving object determines, from among the motion vectors related to the moving object, one or more motion vectors each being detected in, among the plurality of areas, an area that exists on an axis of interest that extends in a different direction from the movement direction of the moving object and passes through the point of interest, as the candidate vector(s).

14. A non-transitory computer-readable medium storing a program for causing a computer to function as a motion vector detection apparatus comprising:
- a detecting unit adapted to detect, for each of a plurality of areas of a base image, a motion vector relative to a reference image;
- a motion vector determining unit adapted to determine, among motion vectors, motion vectors related to a moving object;
- a candidate vector determining unit adapted to determine, based on a point of interest that is a position within an image and a movement direction of the moving object, one or more of the motion vectors related to the moving object as candidate vector(s); and
- a calculating unit adapted to calculate a representative vector of the moving object based on the candidate vector(s),
- wherein the candidate vector determining unit determines, from among the motion vectors related to the moving object, one or more motion vectors each being detected in, among the plurality of areas, an area that exists on an axis of interest that extends in a different direction from the movement direction of the moving object and passes through the point of interest, as the candidate vector(s).

* * * * *